US005801295A

United States Patent [19]

Davey et al.

[11] Patent Number: 5,801,295

[45] Date of Patent: Sep. 1, 1998

[54] ON-BOARD DIAGNOSTIC TEST OF OXYGEN SENSOR

[75] Inventors: Christopher Kirk Davey, Novi; Anand J. Shah, Canton; Donald Fenwick Dickison, Sterling Heights; David R. Nader, Farmington Hills; Robert Joseph Jerger, Livonia; Michael Igor Kluzner, Oak Park, all of Mich.

[73] Assignee: Ford Global Technologies, Inc., Dearborn, Mich.

[21] Appl. No.: 863,221

[22] Filed: May 27, 1997

[51] Int. Cl.[6] .............................. G01M 19/00

[52] U.S. Cl. .............................. 73/1.06

[58] Field of Search .............................. 73/1.06, 118.1; 123/688; 60/277

[56] References Cited

U.S. PATENT DOCUMENTS

| | | | |
|---|---|---|---|
| 5,377,484 | 1/1995 | Shimizu | 60/276 |
| 5,423,203 | 6/1995 | Namiki et al. | 73/118.1 |
| 5,488,858 | 2/1996 | Achleitner | 73/1.06 |

*Primary Examiner*—Robert Reavis
*Attorney, Agent, or Firm*—Peter Abolins

[57] ABSTRACT

An on-board diagnostic test for an exhaust gas oxygen sensor includes sensing the output of the oxygen sensor and summing the output over a specified period to determine the length of the trace of the sensor voltage versus time. Such length over a given time period indicates the activity of the sensor. This data is compared to a threshold to determine if the exhaust gas oxygen sensor meets certain performance requirements.

9 Claims, 3 Drawing Sheets

ON-BOARD DIAGNOSTIC TEST OF OXYGEN SENSOR

BACKGROUND OF THE INVENTION

1. Field of the Invention

This invention relates to an electronic engine control for an internal combustion engine.

2. Prior Art

Electronic engine controls for internal combustion engines are known. Such controls can control various aspects of engine operations such as controlling air fuel ratio, spark advance, fuel injection timing and more complex transition phases between engine start and engine running. Further, such systems are capable of performing on board diagnostic processes for the various sensors used in sensing engine operating parameters which are used in the operation of the engine control processor. Such sensors include temperature and oxygen concentration.

In particular, with respect the performance of an oxygen sensor, which can be used to determine the proper operation of the air fuel ratio of the engine, various diagnostic tests are known. For example, it is known to perturb or vary the air fuel ratio and then sense the voltage output of an exhaust gas oxygen sensor to determine the sensitivity of the internal combustion engine and the associated exhaust to the perturbation of the air fuel ratio. Such a perturbation can be used to detect both the functionality of the air fuel ratio control system and the functionality of the operation of an associated catalyst in the exhaust of the engine.

However, such a perturbation is an intrusive task and may have undesirable side effects. These are some of the problems this invention overcomes.

SUMMARY OF THE INVENTION

An embodiment of this invention provides for a non intrusive heated exhaust gas oxygen sensor (HEGO) monitor that uses the length of the trace of HEGO output voltage versus time, with respect to specified completion criteria, to determine HEGO failure.

In particular the invention teaches a method to analyze the HEGO voltage characteristics. The method nonintrusively monitors the HEGO output voltage and sums voltage trace segments over a specified period. This data is referenced against a threshold to determine if the HEGO meets its performance requirement specifications. This HEGO analysis is not impacted by purge interactions and by any malfunction indication.

In particular, a longer trace of HEGO voltage, i.e., a higher length index, indicates more activity of the HEGO by switching between maximum and minimum voltages. That is, a longer trace may be due to either increased amplitude, increased frequency of switching, or both. Less switching would produce a lower length index because the trace of the voltage versus time, for a given period, would be shorter. Frequency of switching is an indication of the sensitivity, robustness and age of the HEGO sensor.

DETAILED DESCRIPTION OF THE INVENTION

Figure 1:
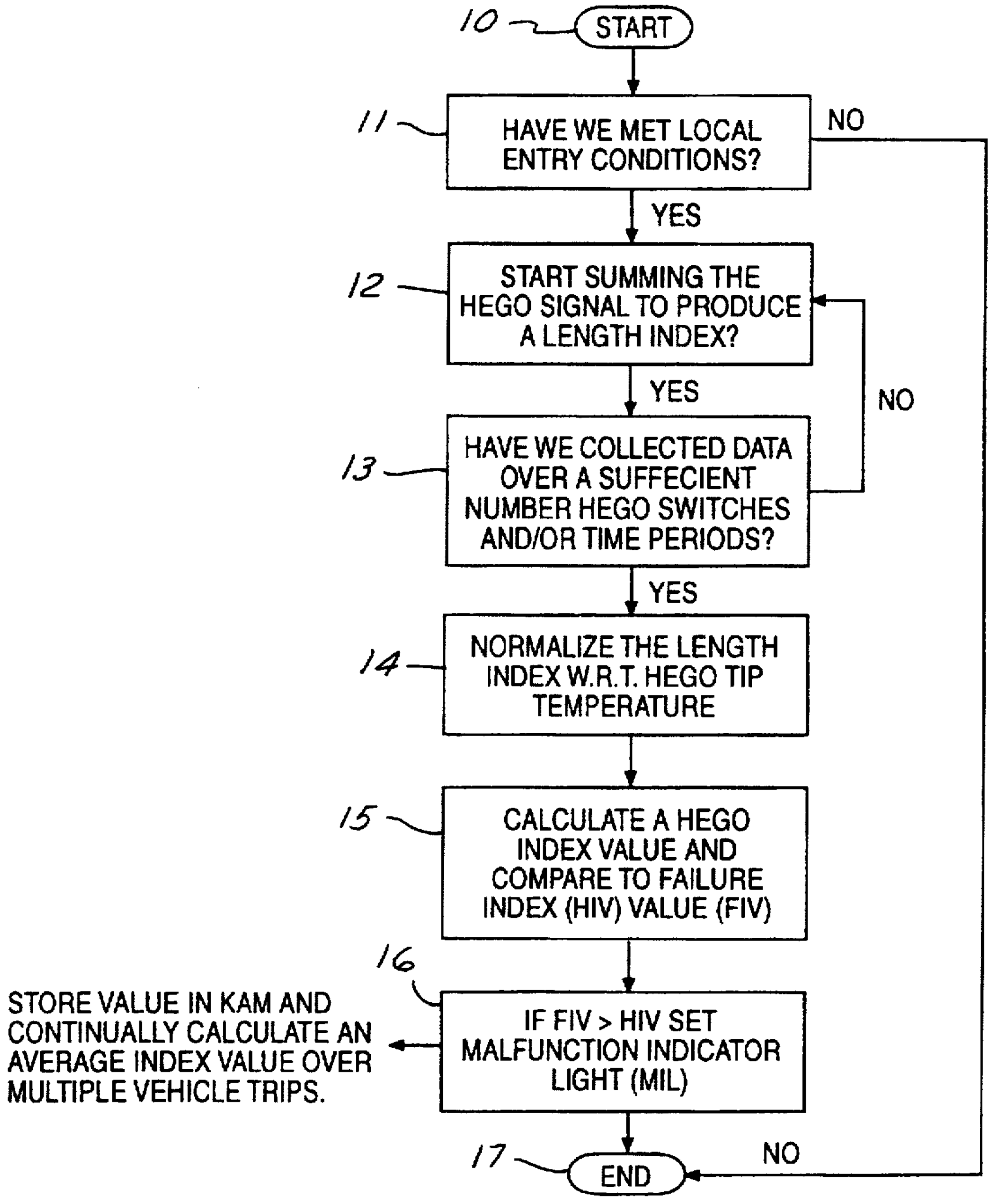
FIG. 1 is a logic flow diagram of a HEGO monitor in accordance with an embodiment of this invention.

Referring to FIG. 1, a block 10 starts the logic flow of this HEGO monitor test. A block 11 asks if local entry conditions for beginning the test have been met. If no, logic flow proceeds to the end of the test at block 17. If yes, logic flow proceeds to a block 12 where the logic flow starts to sum the HEGO voltage signal to produce a length index. Logic flow then goes to a block 13 where it is asked if enough data has been collected over a sufficient number of HEGO switches and or time periods. If no, logic flow returns to block 12. If yes, logic flow goes to a block 14 wherein the length index is normalized with respect to the HEGO tip temperature. Logic flow then goes to a block 15 wherein the HEGO index value (HIV) is calculated and compared to a failure index value (FIV). Logic flow then goes to a block 16 where, if the FIV is greater than the HIV, a malfunction indicator light is set. Logic in block 16 includes setting the value in the keep alive memory (KAM) and continually calculating an average index value over multiple vehicle trip cycles. Logic flow from block 16 goes to end block 17.

The nonintrusive HEGO monitor includes the following features. First, voltage sampling is done to generate fixed sample event data points for the HEGO voltage trace. Second, the HEGO monitor is activated using several unique entry criteria, load, speed, egr, HEGO tip temperature. Third, the successive HEGO voltage data points is processed to determine a voltage trace length, i.e., the length of the trace of the HEGO voltage versus time, using a minimizing algorithm. The algorithm reduces the chronometrics required to execute the monitor by minimizing the use of RAM, ROM, and CPU execution time. An index parameter is calculated that relates directly to the length of the trace of the HEGO voltage versus time. Fourth, the length index of the HEGO voltage is compared to a calibratable threshold length that is representative of a bad HEGO response. Fifth, when the length index is less than the threshold value, the HEGO is considered to have failed its performance requirements specification. The HEGO monitor is able to operate during many modes that preclude operation of existing intrusive HEGO monitors.

Figure 2:
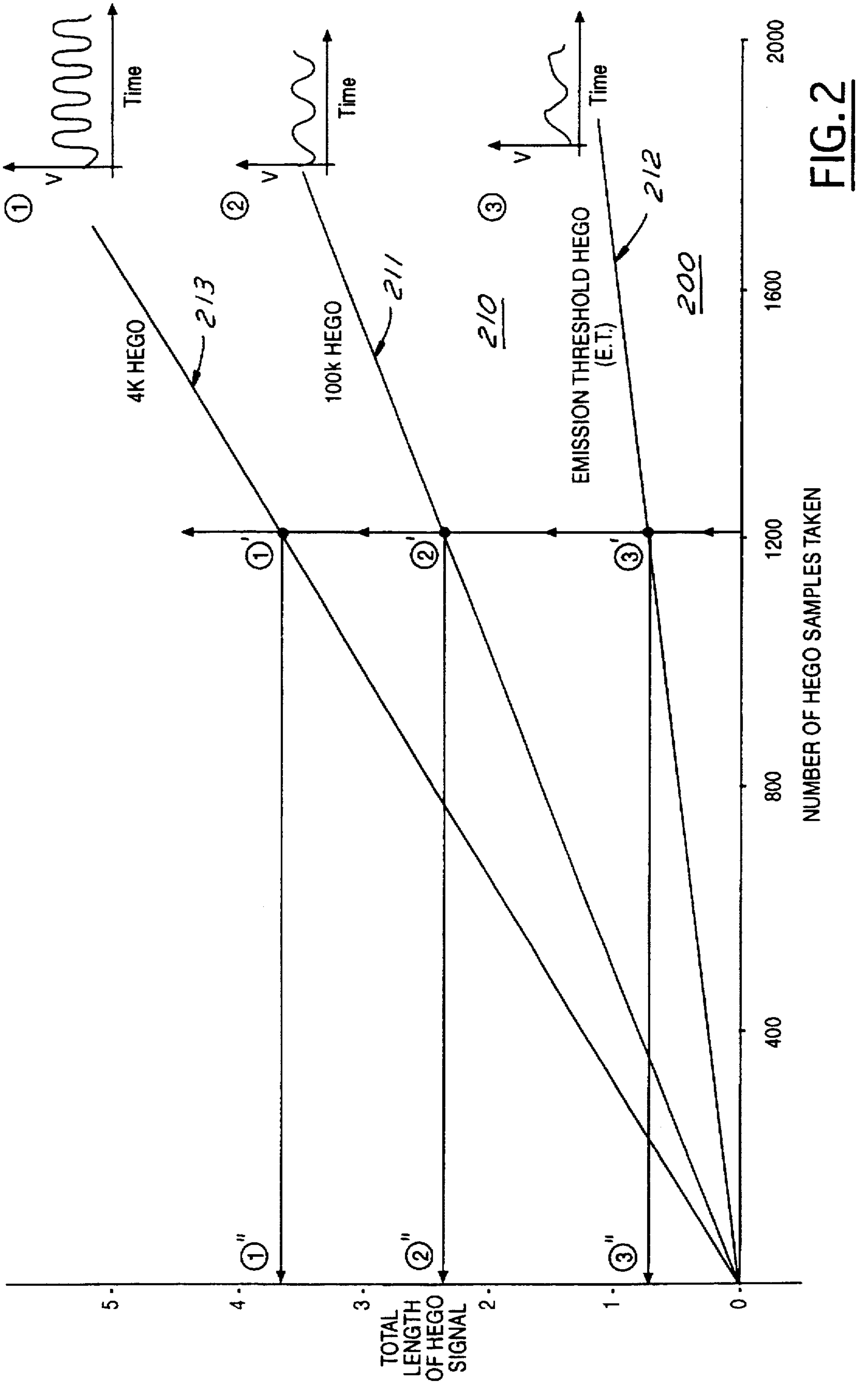
FIG. 2 is a graphical representation of the number of HEGO samples versus the total length of the HEGO signal in accordance of an embodiment of this invention.

FIG. 2 indicates the length index plotted over sample time duration for a good and bad HEGO. The HEGO monitor, in accordance with an embodiment of this invention, will detect any HEGO that fails specific OBDII monitor requirements yet meet fuel control requirements, thus providing the ability to selectively fail the HEGO depending upon specific circumstances. In FIG. 2, the graphical representation of the number of HEGO samples versus the total length of the trace of the HEGO voltage signal shows that as the angle of the line with respect to the axis of the number of HEGO samples increases, the HEGO switching frequency increases. The areas under the lines indicate a failed HEGO sensor in portion 200 and a good sensor in portion 210. For example, line 213 indicates a new HEGO (4k) switching fast at point 1' at 1200 samples and having a length index of 3.8. Line 211 shows an old HEGO (100K) switching less fast at point 2' at 1200 samples and having a length index of 2.2. Line 212 is an emissions threshold HEGO which switches very slowly and at point 3' there a length index of 0.8. By comparing typical expected length index values for a 4K or 100K HEGO against the emissions threshold HEGO (line 212 and point 3'), the performance characteristics of a HEGO can be evaluated.

In accordance with an embodiment of this invention, a variable sample rate is used instead of a fixed interval sampling rate. That is, sampling frequency can be increased with reduced distance from an emissions threshold which is used to indicate a malfunction. For example, sampling can be done every 30 milliseconds, and then, if a possible failure is indicated, sampling can be done every 10 milliseconds. More frequent sampling increases the accuracy of the length index.

Figure 3:
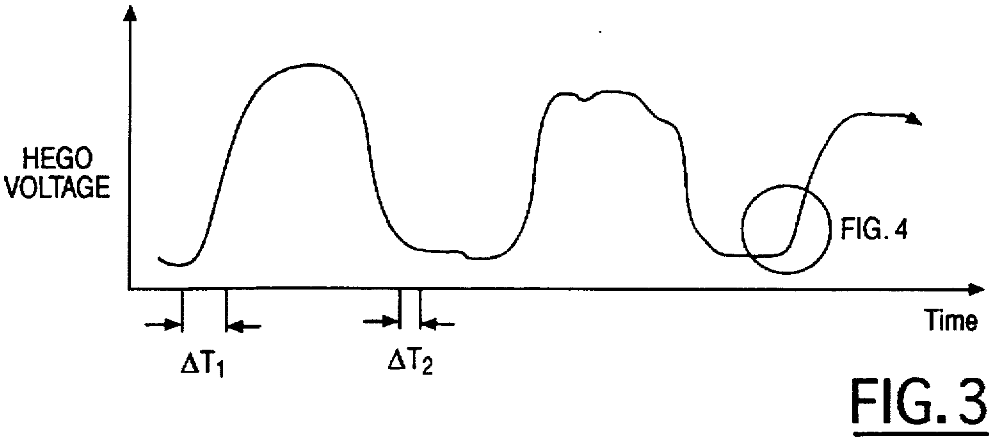
FIG. 3 is a graphical representation of HEGO voltage versus time in accordance of an embodiment of this invention.
Figure 4:
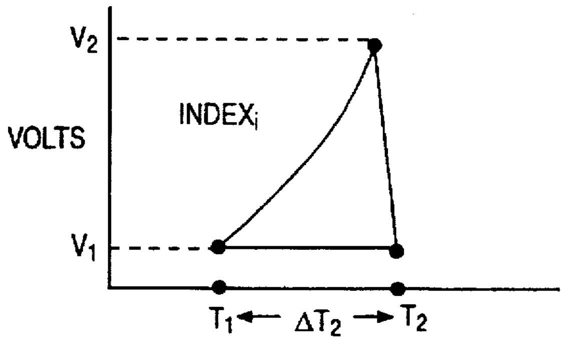
FIG. 4 is an enlargement of a portion of the waveform of FIG. 3 showing a change in the HEGO voltage versus a corresponding change in time.

Referring to FIG. 3, HEGO voltage trace with respect to time is a generally sinusoidal signal trace with line segments being summed during a time delta t. During the test, $\Delta t_2$ is smaller to increase accuracy. More specifically, this is highlighted in FIG. 4 wherein a $\Delta v$ with respect to a $\Delta t_2$ shows the $index_i$. The length of the voltage trace during the sample interval is $index_i = (\Delta t_2^2 + (V_2 - V_1)^2)^{1/2}$. The algorithm will capture the voltage points and the calculation of length index can be performed and integrated every $\Delta t_2$ seconds. The length index becomes for 60 seconds $$index = \sum_{i=0}^{i=60} index_i = \sum_{i=0}^{i=60} \{(A\Delta t)_i^2 + (B\Delta V)_i^2\}^{1/2}$$

where A and B are calibration coefficients

Figure 5:
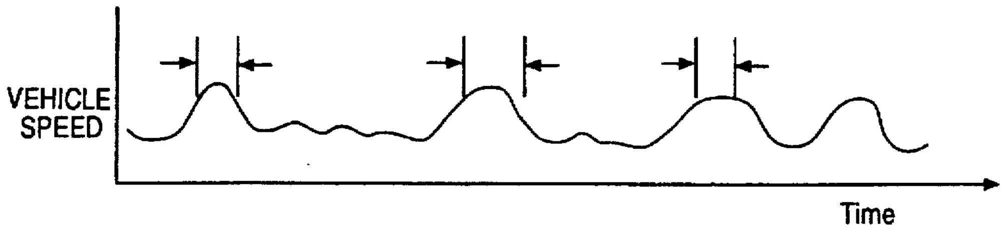
FIG. 5 is a graphical representation of vehicle speed versus time.

Referring to FIG. 5, a trace of vehicle speed versus time has a generally sinusoidal shape with peaks indicating an operating condition with entry conditions to determine when to sample data. Such entry conditions include engine load, engine speed, HEGO tip temperature, engine coolant temperature, air charge temperature, and operation of closed loop air fuel control. Typically, the entry conditions must be between a predetermined minimum value and a predetermined maximum value.

Figure 6:
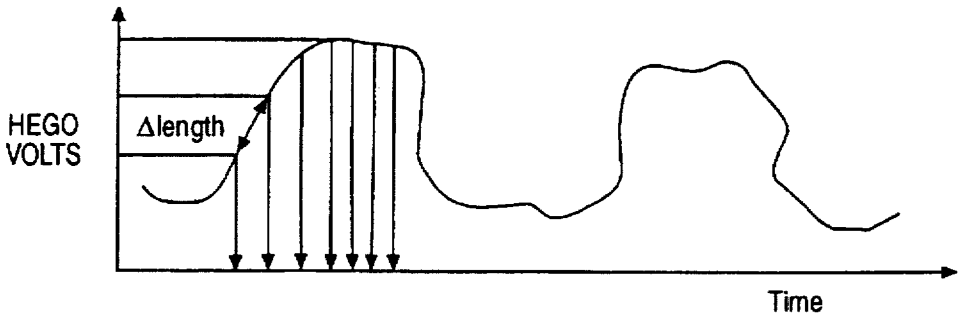
FIG. 6 is a graphical representation of HEGO voltage versus time showing different voltage sampling periods.

Referring to FIG. 6, the trace of HEGO voltage versus time indicates time points at which a voltage sample is taken. As discussed above, delta time and delta HEGO volts are used to determine delta length. The summation of delta length is done over a period of time that entry conditions are met. This method continues to calculate the length until a sufficient number of switches have been analyzed or a minimum time period has been used. If the length index is indicating a possible HEGO malfunction, before a malfunction is actually indicated, the sample period is decreased so that the frequency of sampling is higher. This provides for greater accuracy in determining the length index for the HEGO. FIG. 6 indicates such an increased sampling frequency by showing a decreased time duration between successive samples.

The length index can be used in conjunction with a number of completion criteria to judge the HEGO. For example, the length index can be computed until a predetermined length is reached. The time required to reach such predetermined length is then compared to a predetermined time duration to see if it took longer or shorter to reach the predetermined length than the predetermined time duration. If it took less time, no malfunction of the HEGO would be indicated. Alternatively, the length index can be computed for a predetermined number of counts or switch points. This is analogous to the previously described length index computation during a predetermined time period.

Various modifications and variations will no doubt occur to those skilled in the arts to which this invention pertains. Such variations which basically rely upon the teaching through which this disclosure has advanced the art are properly considered within the scope of the appended claims.

We claim:

1. A method for determining performance of a heated exhaust gas oxygen (HEGO) sensor, including the steps of:
- monitoring nonintrusively a HEGO output voltage trace with respect to time;
- summing the HEGO output voltage trace over a specified completion criteria;
- establishing a predetermined threshold completion criteria for the sum of the HEGO voltage; and
- comparing the summed HEGO output voltage against said threshold completion criteria to determine if the HEGO meets predetermined performance requirement specifications.

2. A method for determining performance of a heated exhaust gas oxygen (HEGO) sensor as recited in claim 1, wherein the step of monitoring the HEGO output voltage includes sampling the HEGO voltage at a first time interval and then at a second time interval, smaller in duration than the first time interval.

3. A method for determining performance of a heated exhaust gas oxygen (HEGO) sensor as recited in claim 1, wherein the step of summing the HEGO output voltage trace over a specified completion criteria includes computing the length index until a predetermined length is reached, determining the time required to reach such predetermined length, comparing the determined time to a predetermined time duration to see if it took longer or shorter to reach the predetermined length than the predetermined time duration, and determining if a malfunction is indicated.

4. A method for determining performance of a heated exhaust gas oxygen (HEGO) sensor as recited in claim 1, wherein the step of summing the HEGO output voltage trace over a specified completion criteria includes computing the length index for a predetermined number of HEGO switch point counts.

5. A method for determining performance of a heated exhaust gas oxygen (HEGO) sensor, including the steps of:
- establishing entry conditions for beginning the method for determining performance of a HEGO sensor;
- determining that the entry conditions have been met;
- sensing a voltage output from the HEGO sensor;
- summing the voltage output from the HEGO sensor over a specified time interval;
- establishing a predetermined amount of voltage data to be collected;
- determining if the predetermined amount of voltage data has been collected;
- if the predetermined amount of voltage data has been collected, normalizing the collected data with respect to the tip temperature of the HEGO sensor;
- calculating a HEGO index values;
- establishing a failure index value;
- comparing the HEGO index value to the failure index value; and
- if the failure index value is greater than the HEGO index value, indicating the occurrence of a malfunction.

6. A method for determining performance of a heated exhaust gas oxygen (HEGO) sensor as recited in claim 5, wherein the step of calculating a HEGO index value includes:
- summing over time the square of the time interval plus the square of the difference of the sampled HEGO voltages.

7. A method for determining performance of a heated exhaust gas oxygen (HEGO) sensor, including the steps of:

monitoring nonintrusively a HEGO output voltage;

determining a length index as a function of the actual length of the trace of the HEGO output voltage versus time over a specified period;

establishing a predetermined threshold for the length index of the trace of the HEGO voltage versus time; and comparing the actual length index of the trace of the HEGO output voltage against the predetermined threshold for the length index to determine if the HEGO meets predetermined performance requirement specifications.

8. A method for determining performance of a heated exhaust gas oxygen (HEGO) sensor as recited in claim 7, wherein the step of monitoring the HEGO output voltage includes sampling the HEGO voltage at a first time interval and then at a second time interval, smaller than the first time interval, before giving any indication that the HEGO sensor is not meeting the predetermined performance requirement specifications.

9. A method for determining performance of a heated exhaust gas oxygen (HEGO) sensor as recited in claim 8, wherein determining the length index of the trace of the HEGO voltage with respect to time includes squaring the time period between sequential samples and adding the square of the difference in the HEGO voltage during each of the samples to generate a function which is indicative of the square of the length index.

* * * * *